United States Patent [19]

Howell et al.

[11] Patent Number: 4,747,272
[45] Date of Patent: May 31, 1988

[54] FROZEN COMESTIBLES WITH IMPROVED OVER-RUN CONTROL

[75] Inventors: Ronald D. Howell, Iowa City; Robin J. Goettsch, Cedar Rapids, both of Iowa

[73] Assignee: Cherry-Burrell Corporation, Cedar Rapids, Iowa

[21] Appl. No.: 65,925

[22] Filed: Jun. 24, 1987

Related U.S. Application Data

[63] Continuation-in-part of Ser. No. 784,352, Oct. 4, 1985, abandoned.

[51] Int. Cl.$^4$ .............................................. F28D 3/00
[52] U.S. Cl. .................................... 62/136; 62/171; 137/101.21
[58] Field of Search .............. 62/171, 136, 69, 70, 62/306; 137/101.21; 364/502

[56] References Cited

U.S. PATENT DOCUMENTS

| | | | |
|---|---|---|---|
| 1,449,458 | 3/1923 | Sutermeister | 62/136 X |
| 2,131,510 | 9/1938 | Gray et al. | 62/171 X |
| 2,530,981 | 11/1950 | Mikina | 62/171 X |
| 3,036,585 | 5/1962 | Shawhan | 137/101.21 X |
| 3,726,102 | 4/1973 | Parks | 62/306 X |
| 3,823,571 | 7/1974 | Smith et al. | 62/136 |
| 4,176,672 | 12/1979 | Borberg | 137/101.21 X |

Primary Examiner—William E. Wayner
Attorney, Agent, or Firm—Fitch, Even, Tabin & Flannery

[57] ABSTRACT

A system is provided for making frozen comestibles, and the like, having an over-run. The system comprises a swept surface heat exchanger which includes a manifolded cylinder in which is disposed a tube having a dasher. Refrigeration means are connected to the manifolded cylinder and the tube is provided with an inlet and an outlet. The system further comprises an air/mix or over-run control system which includes a positive displacement pump having a variable drive, an inlet for a mix, and an outlet. A magnetic flow meter receives mix from the pump outlet and provides a signal proportional to the flow of mix therethrough. An air mass flow control is connected between the mix conduit and a source of pressured air. A control circuit, such as a programmable computer, receives signals from the flow meter and controls both the variable drive on the pump and the pressured air through the air mass flow control.

12 Claims, 3 Drawing Sheets

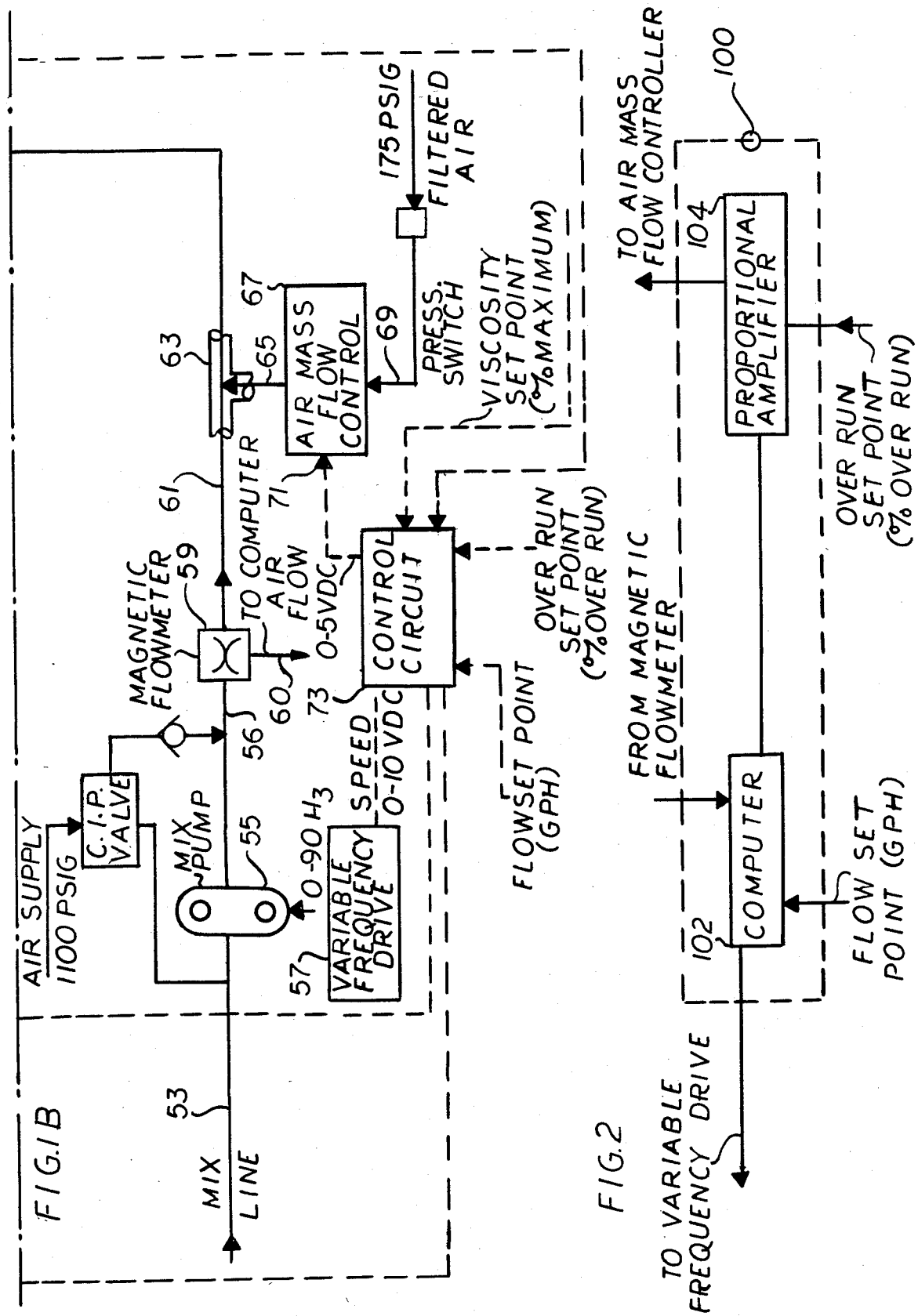

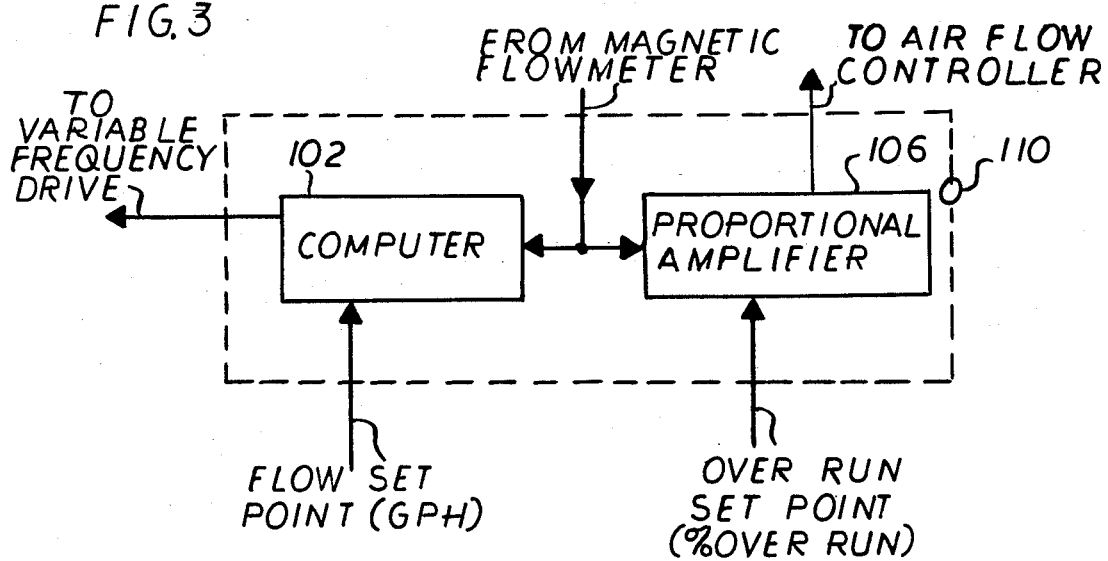
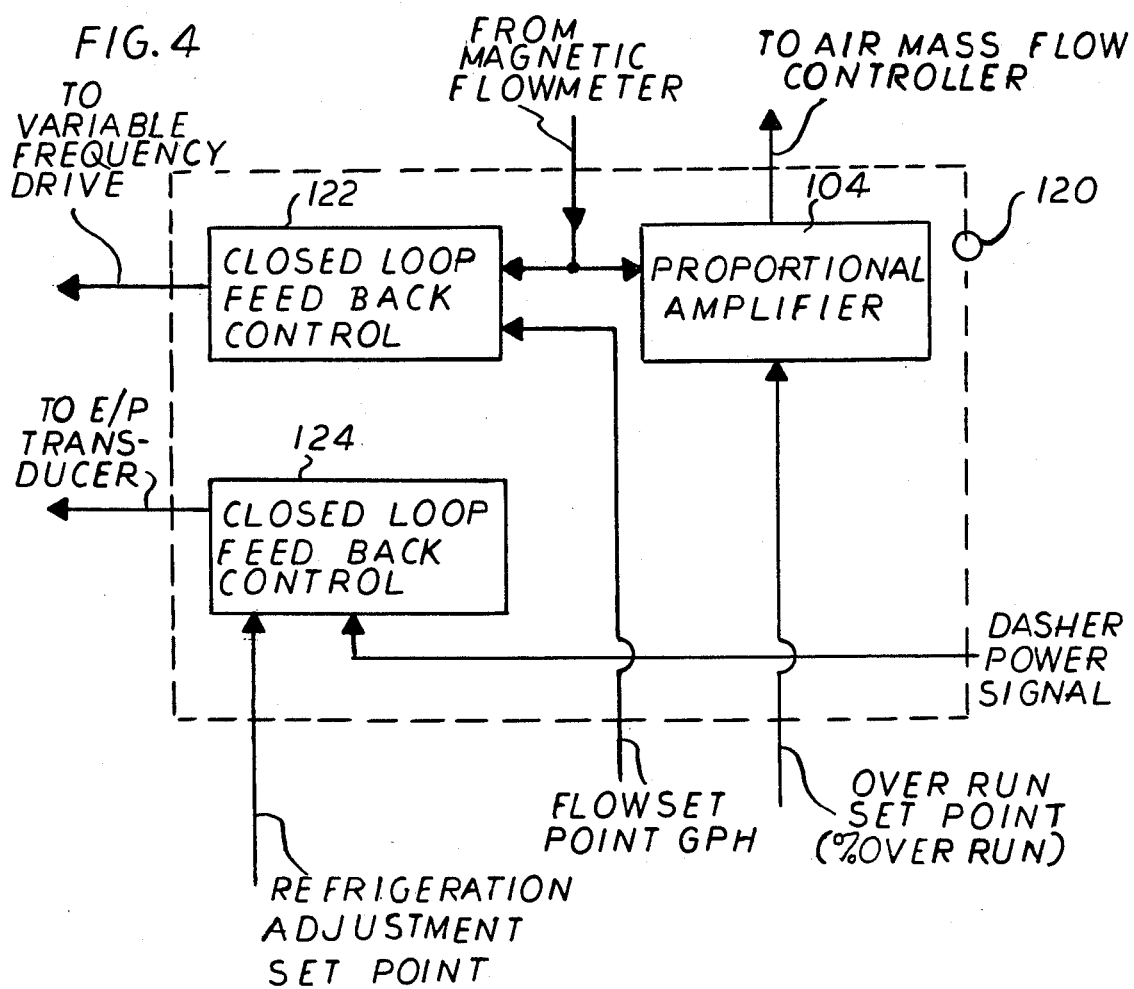

FROZEN COMESTIBLES WITH IMPROVED OVER-RUN CONTROL

RELATED APPLICATIONS

This is a continuation-in-part of U.S. Ser. No. 784,352, filed Oct. 4, 1985, which has been abandoned.

BACKGROUND OF THE INVENTION

The present invention relates generally to a system for making frozen comestibles and the like having an over-run, and, more particularly, the invention relates to a system for making frozen desserts such as ice cream.

In the manufacture of frozen comestibles, the usual practice is to prepare a mix and provide over-run to the product by inclusion of air or inert gas, such as nitrogen, into the mix before entering a swept surface heat exchanger to chill or freeze the mix and provide a product with desired over-run. The heat exchanger is associated with a refrigeration system which connects to a manifold on the heat exchanger. In the normal functioning of the heat exchanger, the air or inert gas is distributed throughout the mix by a dasher resulting in a chilled or frozen product having over-run.

As used herein the over-run is specified as a percentage, by volume, increased by inclusion of air or inert gas. For example, if the mix is increased in volume by the inclusion of 20% of the mix volume of gas, it is said to have a 20% over-run. If equal volumes of mix and gas are included in the final product, it is said to have 100% over-run.

It has been common to introduce the mix into a gear pump which has an inlet for receiving air to provide the over-run. The combination of mix and air are then pumped into the swept surface heat exchanger. The gear pump has had a number of limitations and the heretofore known systems of providing for air injection into the mix have also had limitations so that there have been substantial variations in the over-run. Thus, these previously known systems have not provided consistency in over-run control in the manufacture of frozen comestibles, including frozen desserts, ice cream, sherbet, and the like. In the manufacture of these products it is desired to provide between 20% and 200% over-run.

In heretofore known systems, as indicated, it is usual to provide the pump for feeding the mix and gas to the swept surface heat exchanger but also to provide a pump at the outlet of the heat exchanger, thereby requiring multiple pumps. Further, heretofore known systems have required major changes, such as sprocket changes, to accommodate a wide range of over-run. In addition, in systems known before this invention, the amount of inclusion of air was subject to variations in line pressure.

The use of gear pumps in systems for manufacturing frozen comestibles also had limitations in providing desired control of the over-run. The gear pump is affected by the viscosity of the mix, and the mix temperature likewise affects the gear pump operation. Upstream and downstream pressure had an effect upon the operation of the gear pump as well. Further, the gear pump tends to wear because of gear meshing whereas it would be desirable to avoid this wear in the operation of the system.

The prior systems had difficulty with shut-downs occasioned by the need for terminating the output of the swept surface heat exchanger as might result from a problem in the product packaging line. It is difficult, in many prior systems, to effect start-up after such a shut-down.

SUMMARY OF THE INVENTION

A principal object of this invention is to provide an improved system for making frozen comestibles and the like having over-run.

A further object of the invention is the provision of an improved system for making frozen comestibles and the like with closely controlled over-run which does not vary significantly during operation.

A still further object of the invention is the provision of an improved system for making frozen comestibles which can be readily varied to accommodate different throughputs and different over-runs in the system.

An additional object of the invention is the provision of an improved system for making frozen comestibles and the like having varied over-runs, which system can be placed on hold and readily started up.

Another object of the invention is the provision of an improved system for making frozen comestibles and the like, which has more life and can be easily maintained.

Still another object of the invention is the provision of an improved system for making frozen comestibles and the like, which does not require a pump at the output of a heat exchanger in addition to an input pump.

These and other objects of the present invention which will become apparent from studying the appended claims and description are provided in a system for making frozen comestibles and the like which has an over-run comprised of a swept surface exchanger which includes a manifold cylinder. The manifold cylinder contains a tube having a dasher, refrigeration means connected to the manifolded cylinder, an inlet to the tube, an outlet from the tube and an air/mix system. The improved air/mix system comprises a positive displacement pump having an inlet for a mix, a variable drive and an outlet. Means are provided for metering the flow of mix from the pump outlet and for providing a mix flow signal proportional to the flow of mix therethrough. A mix conduit connects the flow meter and the inlet to the tube, and air mass flow control means connect the mix conduit to a source of pressured air. An electronic circuit has flow signal input means for receiving an input flow signal and for controlling both the variable drive for the pump and the pressured air through the air mass flow control, and means for connecting only the mix flow signal to the flow signal input means.

DRAWINGS

In the drawings, wherein like elements are referenced alike.

FIG. 1A and FIG. 1B show an overall diagram of the system of the invention for making frozen comestibles and the like;

FIG. 2 is a schematic diagram in block form, illustrating an alternative hybrid electronic control circuit for the system of FIG. 1;

FIG. 3 is a schematic diagram in block form of another hybrid electronic control circuit for use in the system of FIG. 1; and FIG. 4 is a schematic diagram in block form of an analog control circuit for use with the system of FIG. 1.

DESCRIPTION OF THE INVENTION

Figure 1A:
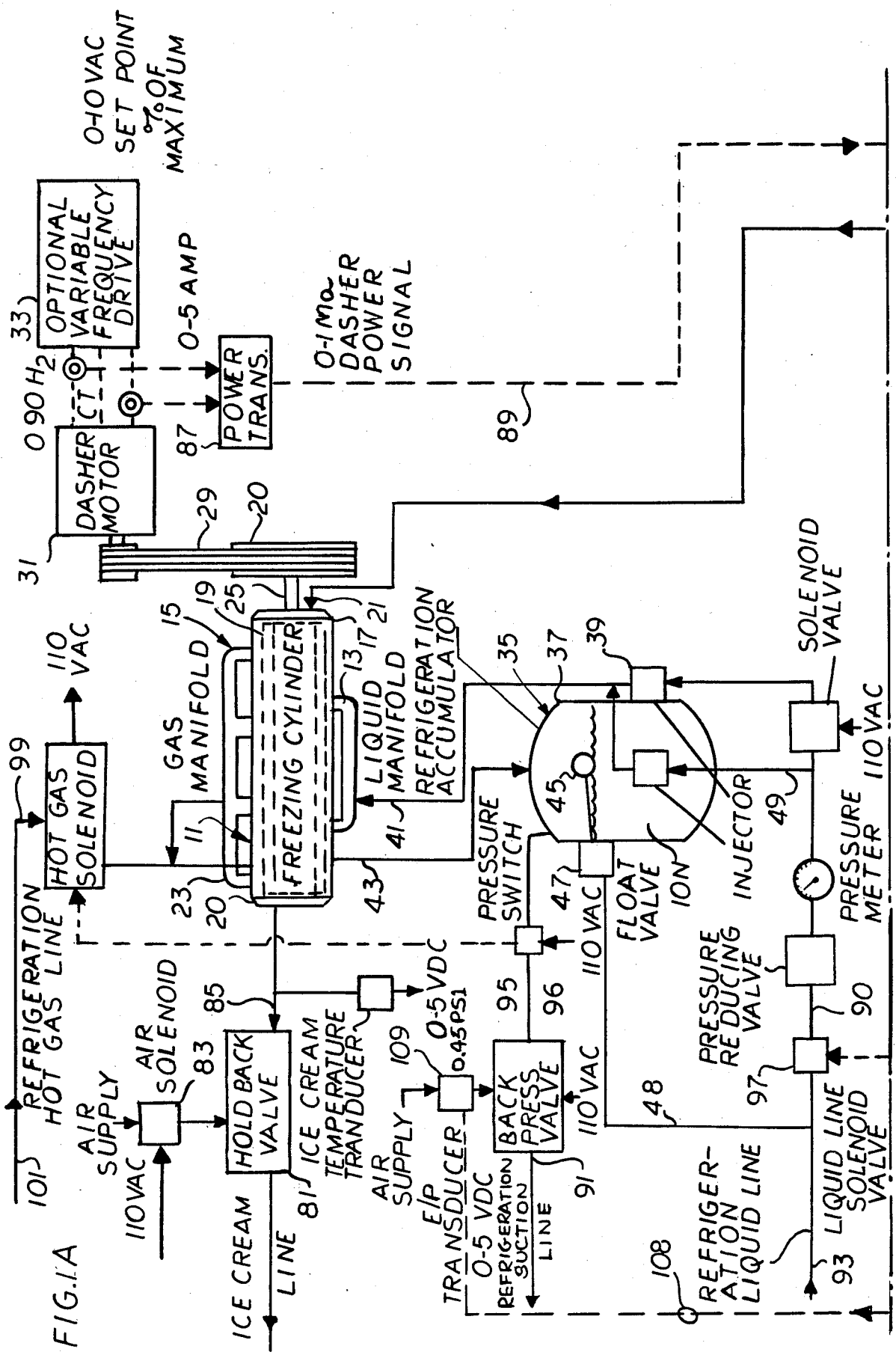

The system of the invention is particularly adapted for making frozen comestibles and the like, having an over-run which is effected by the inclusion of air or an inert gas in a mix which is fed into a swept surface heat exchanger for chilling or freezing. The frozen comestibles can be frozen desserts, ice cream, sherbets, or the like.

Referring to FIG. 1, the system generally includes a swept surface heat exchanger 11, which has a liquid manifold 13 and a gas manifold 15 associated with cooling means. The swept surface heat exchanger 11 includes a manifold cylinder 17 in which is disposed a tube 19. A dasher 20 is located within the tube 19, the dasher and tube being shown by dotted lines in FIG. 1. The manifold cylinder connects to the gas and liquid manifolds 15 and 13. The swept surface heat exchanger 11 has an inlet 21 and discharges through an outlet 23. The dasher 20 is driven by a shaft 25, which connects to a pulley 27. The pulley 27 is driven by means of a belt 29, which is, in turn, driven by a dasher motor 31. The dasher motor 31 may be controlled by a variable drive 33, which may be varied by changes in frequency of the electrical power.

The cooling means is a refrigeration unit, which is generally designated by the numeral 35, and is of conventional design and construction, and accordingly is only briefly described herein. Generally, the refrigeration unit 35 comprises an accumulator 37 for holding ammonia or other refrigerant. The accumulator 37 connects to an injector 39, which feeds liquid refrigerant through line 41 to the liquid manifold 13 of the swept surface heat exchanger 11. Gas from the heat exchanger 11 may be returned through a line 43 from the gas manifold 15. The level of refrigerant in the accumulator 37 is controlled by means of a float valve 45, which connects to a level controller 47, and allows liquid refrigerant to enter the accumulator through line 48. Liquid refrigerant may also enter through line 49.

An improvement provided by one aspect of the invention comprises an air/mix system, generally designated 51, and particularly shown in FIG. 1, which includes a feed line 53 for introduction of the mix into a positive displacement pump 55. While the pump 55 may be a conventional gear pump, it has been found more desirable to provide a lobe pump, such as a Waukesha pump, which provides longer life and less wear in the pump. In a gear pump, the gears normally mesh and typically one gear drives another gear, whereas in a lobe pump, the lobes do not contact one another and minimal wear occurs. The pump 55 is provided with a variable speed drive 57, which preferably includes a voltage controlled oscillator (VCO) to produce a variable frequency output which varies the speed of the pump 55. The variable speed drive 57 can easily control the pump 55 to effect a wide range of mix flow.

It will be noted that no air or inert gas is introduced into the pump 55 as has been conventional. The pump discharges through conduit 56, which feeds mix into a magnetic flow meter 59. The magnetic flow meter is available on the market and includes a meter body and a signal conditioner associated with the meter body. The magnetic flow meter 59 relies on Faraday's Law of Electromagnetic Induction to generate a signal responsive to the flow of mix through the magnetic flow meter 59. As the mix flows through the magnetic field generated by high density coils of the flow meter, a voltage is generated which is directly proportional to the velocity of the mix flowing through. Electrodes in contact with the mix flow send the flow induced voltage to the signal conditioner which converts this voltage to a pulse and-/or analog current output through line 60. The magnetic flow meter is available on the market and a particularly satisfactory magnetic flow meter 59 is the Brooks Wafer-Mag Electromagnetic Flow Meter available from Brooks International Division of Emerson Electric Co.

The flow meter 59 discharges into conduit 61 for carrying the mix to the swept surface heat exchanger 11, and particularly to its inlet 21. Downstream of the magnetic flow meter 59 air or inert gas is introduced into the conduit 61 by means of a tee 63, which connects to an air line 65. The tee is provided with a check valve (not shown). The amount of air which enters the conduit 61 from air line 65 is controlled by an air mass flow control means 67, which receives filtered and pressured air through line 69. The air mass flow control means 67 is also available in the market and automatically controls the air mass flow through the air line 65. One particularly satisfactory air mass flow control means is the Brooks Model 5850C sold by Brooks Instrument Division of Emerson Electric Co. The flow control means 67 receives input signals through line 71, so as to control the amount of air introduced into the conduit 61E.

An electronic control circuit 73 serves to control the flow rate of the mix through the pump 55, and to control the air into the conduit 61 by means of the input signals to the flow control means 67 through line 71. According to one aspect of the present invention, the control circuit 73 responds only to the mix flow process variable to control both mix flow and air flow process variables. The control circuit 73 is set at a given flow rate (flow set point) and also set to provide air for a desired over-run (over-run set point). The signal from the magnetic flow meter 59 is in proportion to the actual flow of the mix. This signal, as mentioned above, also serves to simultaneously control the over-run, which is set in the control circuit 73, by feeding a control signal to the air mass flow control means 67. One example of control circuit 73 is a programmable computer, available in the market and identified as PiC 49, sold by Giddings and Lewis Electronics Company. Because various software programs can be developed from the described functions within the skill of the art for the operation of the control circuit 73, it is not necessary to further describe the software program. This particular computer, as indicated in FIG. 1, receives input signals from the magnetic flow meter 59 (via line 60), a dasher power signal, as well as control signals from over-run and viscosity set point controls. The computer has outputs to the variable frequency drive 57, air mass flow control 67 as well as the voltage to power (E/P) transducer 109 and liquid line solenoid valve 97. Three other examples of control circuits will be given below.

The control circuit 73 provides control of the mix pump 55 by means of the signal from the flow meter 59 so as to control the frequency output of variable drive 57. Thus, the flow is set, monitored and controlled regardless of temperature fluctuations and/or viscosity changes in the mix. Further, wide variations in the set flow can be made without difficult drive changes to the pump 55 as by having to change sprockets. The signal from the flow meter 59 through the control circuit 73 also simultaneously adjusts the set flow of air through the flow controller 67, thereby maintaining consistency of over-run.

Thus, the control circuit 73 serves to control the speed of the pump 55 for a desired flow rate, and varies the speed by change of frequency in the event that the feed through the line 56 is not in accord with the set flow rate. Likewise, the output of the flow meter 59 may vary and provide a variable signal to the programmable control circuit 73 to adjust the air passing through the air mass flow controller 67. Thus, the overall system serves to provide precise and continuous control of over-run at a predetermined value. Variations in the operation of the pump or in the mix are accommodated automatically in a system providing a highly advantageous control.

As indicated in FIG. 1, control circuit 73 is a convenient means of providing ancillary control signals to the voltage-pressure transducer 109, which in turn controls vacuum in the refrigeration suction line 91, and the liquid line solenoid valve 97 which controls the flow in refrigeration liquid line 93. Accordingly, it is also convenient to monitor an ancillary viscosity set point control with the control circuit. However, these ancillary control and set point signals are not necessarily related to control of the mix pump 55 and air mass flow controller 67, and accordingly may be made independent therefrom, or may be omitted altogether, from the point of view of providing over-run control. In fact, as will be seen in the following examples of control circuits, capability of automatically controlling the liquid line solenoid valve 97 and the voltage-pressure transducer 109 is not provided, and is not essential to operation of the overall system. Instead, control of the liquid line solenoid valve 97 is provided by external relay logic, while the voltage-pressure transducer is run in an open-loop mode.

Referring now to FIG. 2, a schematic diagram in block form of a hybrid electronic control circuit 100 is illustrated as another example of the control circuit 73 of FIG. 1. The hybrid control circuit 100 includes a programmable computer 102, identified as Model UDC 4000 (Universal Digital Controller) available from the Process Control Division of Honeywell, Inc. The programmable computer 102 receives as its only process variable input the signal from magnetic flow meter 59 via line 60, and produces at its output a speed control signal which is fed into variable frequency drive 57 for controlling mix pump 55. The circuit 100 also includes an adjustment for the flow set point of mix pump 55.

In hybrid control circuit 100, the same signal outputted from flow meter 59 is also fed into a current follower type of proportional amplifier having an optically isolated linearly proportional output with continuously variable ratio adjustment. The proportional amplifier, designated by numeral 104 is commercially available as an isolated signal interface, part no. 680120 available from the Parametrics Unit of ASEA Corporation. The isolated signal interface unit, as will be seen in the following examples, is a multi-purpose control device which can be configured for a number of different operating modes, only one of which is the desired voltage follower mode which receives a voltage signal outputted from the programmable computer 102. The proportional amplifier 104 also has adjustment for the over-run set point for the air mass flow control 67. At 100 percent or full scale over-run set point setting, the 0-7 volt DC signal outputted from programmable computer 102 is reduced in magnitude by amplifier 104 to produce a 0-5 volt DC signal which follows the wave form of the programmable computer output signal in real time. As indicated above, external relay logic controls the liquid line solenoid valve 97, while the voltage-pressure transducer runs in an open-loop mode, unconnected to circuit 100.

Turning now to FIG. 3, a second example of control circuit 73, that of a hybrid control circuit 110, is illustrated. Control circuit 110 includes the same programmable computer 102 as in FIG. 2, but the proportional amplifier 104 is reconfigured as a current follower to directly receive the same magnetic flow meter signal as is inputted to the programmable computer 102. In a manner analogous to that described above with respect to FIG. 2, the follower has an optically isolated, linearly proportional output, with continuously variable ratio adjustment identified as the over-run set point in FIG. 3. Thus, the current follower converts the 4-20 milliamp signal outputted from the magnetic flow meter 59 to a 0-5 volt DC signal (assuming full scale 1:1 ratio setting of the over-run set point). At a 50 percent setting (0.5:1 proportionality), for example, the proportional amplifier 104 produces a 0-2.5 volt DC signal at its output which follows the wave form of the inputted current loop signal from the magnetic flow meter in real time. The remaining features are the same as those described above for FIG. 2.

Referring now to FIG. 4, a fourth, analog example 120 of control circuit 73 is illustrated, having a current follower proportional amplifier 106 as described above with respect to FIG. 3. However, in place of the programmable computer 102, the analog control circuit 120 includes a closed loop comparator or analog feedback control circuit 122. In the preferred embodiment, control circuit 122 comprises the same isolated signal interface device as that described above with respect to the proportional amplifier 104, but having been reconfigured with a comparator feedback option, identified as part no. 680119 by the Parametrics Unit of ASEA Corporation. The analog circuit 122 receives the 4-20 milliamp output of magnetic flow meter 59 and, according to the setting of the flow set point adjustment, provides closed loop feedback control of pump 55, via a 0-10 volt DC signal which is fed to the variable frequency drive 57. An optional, identical analog control circuit 124 receives the dasher power signal to control the pressure in refrigeration means 35 via a signal to the voltage-pressure transducer 109.

Thus, it can be seen that the control circuit 73 can be embodied in a digital computer, as well as analog, and hybrid electronic circuits. Although the digital computer and various analog circuits described above are conveniently provided as discrete electronic assemblies by their commercial sources, it will be readily appreciated by those skilled in art that "custom" hardware circuitry can be readily fabricated so as to duplicate and otherwise incorporate the functions and operating characteristics of the various discrete digital computer and analog circuit components. However, as pointed out above, each of the control circuits 73, regardless of their digital, analog or hybrid form, receives only the mixed flow process variable to control both mix and air flows.

A feature of the invention is the allowance for hold times when the output of the swept surface heat exchanger 11 is not required, such as in the case of a packaging line shutdown. This feature requires a programmable computer type of control circuit, such as the Giddings and Lewis PiC 49 programmable computer, as described above with reference to FIG. 1B. When the above-described condition occurs, a back pressure valve 95 in line 96 is controlled by means of the voltage/pressure (E/P) transducer operated by the programmable computer. When the back pressure valve is open, i.e., the refrigeration suction line 91 is open, the viscosity of the mix in the heat exchanger 11 will increase, thereby causing an increased power requirement from the dasher motor 31. This increased power is read by a power transducer 87, and the increase in power requirement is indicated as a signal to the programmable computer through line 89. Thus, the back pressure valve 95 is operated by the programmable computer in response to the signal from the power transducer 87, so as to control the pressure in the accumulator through line 96. The flow in the refrigerant liquid line 90, which feeds the injector 39, is controlled by a solenoid valve 97. The programmable computer also controls flow line 90 by means of a liquid line solenoid valve 97. By configuring the programmable computer (e.g., by programming the computer) the pressure in the swept surface heat exchanger gas manifold 15 is controlled so as to reduce the cooling and thereby allow the dasher 20 to continue to rotate during a hold period. The advantage of this particular system is that the swept surface heat exchanger 11 can continue to function while the holdup in the output of the swept surface heat exchanger is being corrected or adjusted. At the same time that the hold-back valve 81 is closed by the programmable computer, the pump 55 is stopped by the same programmable computer. It should be noted that the power transducer 87 functions during normal operation to provide input to the programmable computer as a result of sensing viscosity changes in the mix in the tube 19. This provides further control and consistency of over-run.

The system of the invention further includes a "hot gas" system for melting down the product in the swept surface heat exchanger 11. This hot gas system is generally designated 99, and is not unusual in the art so that it will not be further described, although the drawing generally illustrates the manner of operation of the hot gas system. The hot gas is supplied through line 101 to the hot gas system 99.

In operation of the system, mix is fed into the system through line 53 and into the pump 55. The pump is controlled by a variable frequency drive 57 and the output of the pump passes through line 56 to the magnetic flow meter 59. The mix, after being sensed by the magnetic flow meter 59, passes through line 61 and into tee 63 into which air is introduced from the air mass flow control means 67. The mixture of air and mix then passes to the inlet 21 of the swept surface heat exchanger 11, wherein it is chilled and/or frozen while being whipped by means of the dasher 19. The product with the desired over-run leaves the swept surface heat exchanger 11 through outlet 23 and passes through line 85 through the hold-back valve 81 to a packaging line.

As indicated, the flow meter 59 provides a signal in proportion to the flow rate of mix therethrough. This signal serves to provide an input to the control circuit 73, which provides output signals for controlling the variable frequency drive 57 and controlling the air mass flow control means 67. The control circuit 73 has set points for the throughput of the system and provides variable adjustment of the over-run between wide ranges.

In the event that the hold-back valve 81 is shut because of a cut-off in the need for the product, viscosity increases in the swept surface heat exchanger 11, causing an increased power requirement to dasher motor 31, whereupon this power increase is sensed by the power transducer 87, which signals the control circuit 73. The refrigeration means 35 for the swept surface heat exchanger 11 is controlled by the control circuit 73 to increase the pressure of the refrigerant in the manifold cylinder 17. The control circuit 73 also causes the pump 55 to stop. Thus, the swept surface heat exchanger 11 can readily be placed upon hold without shutdown of the whole system with consequent loss of product.

The overall system of the invention provides unique results and advantages over the heretofore known systems for the making of frozen comestibles with over-run. The various advantages have been outlined in the foregoing.

As has been shown, only one process flow, the mix flow, is measured to control both mix and air flows. Three alternative arrangements of control circuits for achieving the same result are illustrated in FIGS. 2–4, wherein each electronic control circuit receives the mix flow signal and controls, in response thereto, the air mass flow control 67, as well as the drive control 57 for the mix pump 55.

The various features of the invention, which are believed to be new, are set forth in the following claims.

What is claimed is:

1. A system for making frozen comestibles and the like having over-run comprising a swept surface exchanger which includes a manifold cylinder in which is disposed a tube having a dasher, refrigeration means connected to the manifolded cylinder, an inlet to the tube, an outlet from the tube and an air/mix system; an improved air/mix system comprising a positive displacement pump having an inlet for a mix, a variable drive and an outlet, means for metering the flow of mix from said pump outlet and for providing a mix flow signal proportional to the flow of mix therethrough, a mix conduit connected between said flow meter and the inlet to the tube, air mass flow control means connected between said mix conduit and to a source of pressured air, electronic circuit means having flow signal input means for receiving an input flow signal and for controlling both said variable drive for said pump and the pressured air through said air mass flow control means in response thereto, and means for connecting only said mix flow signal to said flow signal input means of said electronic circuit means.

2. A system in accordance with claim 1 wherein said positive displacement pump is a lobe pump.

3. A system in accordance with claim 1 wherein said electronic circuit means sets the flow of said mix and the over-run set point.

4. A system in accordance with claim 1 wherein said variable drive is responsive to variation in frequency.

5. A system in accordance with claim 1 wherein said signal simultaneously controls the flow of said mix and the air mass flow control means.

6. A system in accordance with claim 1 which further includes a motor connected to the dasher and a power transducer connected to the motor which conducts a signal to said electronic circuit means.

7. A system in accordance with claim 1 which further includes a hold back valve at the outlet from the cylinder, a motor connected to the dasher, a power transducer connected to the motor for sensing power requirements of said motor and providing input to said computer, means for controlling the refrigeration means connected to said computer, and means in said electronic circuit means for stopping said pump.

8. A system in accordance with claim 7 which further includes a hold-back valve at the outlet of the tube.

9. A system in accordance with claim 1 wherein said electronic circuit means further includes set point input means for receiving a set point signal for controlling in response thereto, in combination with said mix flow signal, the variable drive for said pump and the pressured air through said air mass flow control means.

10. A system in accordance with claim 1 wherein said electronic circuit means includes a programmable computer receiving said signal from said flow meter and controlling both said variable drive for said pump and the pressurized air through said air mass flow control means.

11. A system in accordance with claim 1 wherein said electronic circuit means comprises a programmable computer and a proportional amplifier, both receiving said signal from said flow meter, said programmable computer controlling said variable drive for said pump and said proportional amplifier circuit controlling the pressurized air through said air mass flow control means.

12. A system in accordance with claim 1 wherein said electronic circuit means comprises a comparator feedback circuit operating in a closed loop mode and a proportional amplifier, both receiving said signal from said flow meter, said comparator feedback circuit controlling said variable drive for said pump, and said proportional amplifier circuit controlling the pressurized air through said air mass flow control means.

* * * * *